United States Patent
Ido et al.

(10) Patent No.: US 9,469,262 B2
(45) Date of Patent: Oct. 18, 2016

(54) VEHICLE POWER-SUPPLY CONTROL DEVICE

(71) Applicants: Yusaku Ido, Gifu (JP); Takashi Yamada, Gifu (JP); Tadao Nishiguchi, Aichi (JP); Masayuki Hanatani, Aichi (JP); Hideyuki Yasugi, Aichi (JP)

(72) Inventors: Yusaku Ido, Gifu (JP); Takashi Yamada, Gifu (JP); Tadao Nishiguchi, Aichi (JP); Masayuki Hanatani, Aichi (JP); Hideyuki Yasugi, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 470 days.

(21) Appl. No.: 13/917,089

(22) Filed: Jun. 13, 2013

(65) Prior Publication Data

US 2013/0334879 A1 Dec. 19, 2013

(30) Foreign Application Priority Data

Jun. 15, 2012 (JP) ................................. 2012-135821

(51) Int. Cl.
    *B60R 16/033* (2006.01)
    *B60L 1/00* (2006.01)
    (Continued)

(52) U.S. Cl.
    CPC ................ *B60R 16/033* (2013.01); *B60L 1/00* (2013.01); *B60L 1/003* (2013.01); *B60L 1/14* (2013.01);
    (Continued)

(58) Field of Classification Search
    CPC .... B60R 16/033; B60L 11/1816; B60L 1/14; B60L 11/1805; B60L 1/00; B60L 1/003; B60L 11/1824; B60L 11/1868; B60L 2210/10; B60L 2210/30; Y02T 10/92; Y02T 10/7066; Y02T 90/121; Y02T 90/14; Y02T 10/7241; Y02T 10/7216; Y02T 90/127

USPC ........................................................ 307/10.1
See application file for complete search history.

(56) References Cited

U.S. PATENT DOCUMENTS

| | | |
|---|---|---|
| 6,426,884 B1 | 7/2002 | Sun |
| 2003/0029654 A1 | 2/2003 | Shimane et al. |

(Continued)

FOREIGN PATENT DOCUMENTS

| | | |
|---|---|---|
| CN | 1504014 A | 6/2004 |
| DE | 102035489 A1 | 8/2003 |

(Continued)

OTHER PUBLICATIONS

Patent Abstracts of Japan; Publication No. 2009-027774, Publication Date: Feb. 5, 2009 (1 Page).

(Continued)

*Primary Examiner* — Jared Fureman
*Assistant Examiner* — Emmanuel R Dominique
(74) *Attorney, Agent, or Firm* — Osha Liang LLP

(57) ABSTRACT

A vehicle power-supply control device has a battery charger that converts an externally-supplied AC voltage into a DC voltage used to charge a vehicle high-voltage battery, a low-voltage power generator that converts the DC voltage output from the battery charger into a DC voltage used to drive a vehicle auxiliary machine, and a controller that controls the battery charger and the low-voltage power generator. The battery charger includes a power factor correction circuit that corrects a power factor of the AC voltage and a first DC/DC converter that generates a predetermined DC voltage based on an output of the power factor correction circuit. The low-voltage power generator includes a second DC/DC converter that steps down the DC voltage output from the battery charger and a synchronous rectifier that rectifies an output of the second DC/DC converter in synchronization with a switching operation of the second DC/DC converter.

3 Claims, 3 Drawing Sheets

(51) Int. Cl.
*B60L 1/14* (2006.01)
*B60L 11/18* (2006.01)

(52) U.S. Cl.
CPC ........ *B60L 11/1805* (2013.01); *B60L 11/1816* (2013.01); *B60L 11/1824* (2013.01); *B60L 11/1868* (2013.01); *B60L 2210/10* (2013.01); *B60L 2210/30* (2013.01); *Y02T 10/7005* (2013.01); *Y02T 10/7066* (2013.01); *Y02T 10/7072* (2013.01); *Y02T 10/7216* (2013.01); *Y02T 10/7241* (2013.01); *Y02T 10/92* (2013.01); *Y02T 90/121* (2013.01); *Y02T 90/127* (2013.01); *Y02T 90/14* (2013.01)

(56) References Cited

U.S. PATENT DOCUMENTS

| | | | |
|---|---|---|---|
| 2008/0170418 A1* | 7/2008 | Nishiyama | H02M 3/337 363/17 |
| 2008/0316774 A1 | 12/2008 | Ito et al. | |
| 2010/0277132 A1* | 11/2010 | Hara | B60L 11/1864 320/163 |
| 2010/0289329 A1 | 11/2010 | Nakajima et al. | |
| 2011/0202220 A1* | 8/2011 | Seta | B60L 1/00 701/22 |
| 2012/0068663 A1* | 3/2012 | Tanikawa | B60L 11/1816 320/109 |
| 2013/0020863 A1 | 1/2013 | Sugiyama et al. | |
| 2014/0159478 A1* | 6/2014 | Ang | B60L 1/00 307/9.1 |

FOREIGN PATENT DOCUMENTS

| | | |
|---|---|---|
| DE | 102009-007737 A1 | 8/2010 |
| JP | 2001-112245 A | 4/2001 |
| JP | 2009027774 A | 2/2009 |
| JP | 2010-213366 A | 9/2010 |
| JP | 2011072069 A | 4/2011 |
| JP | 2011223833 A | 11/2011 |
| JP | 2012-016116 A | 1/2012 |

OTHER PUBLICATIONS

Patent Abstracts of Japan, Publication No. 2011-072069, Publication Date: Apr. 7, 2011 (1 Page).

First Notification of Office Action issued in corresponding Chinese Application No. 201310218330.3, mailed on Dec. 25, 2014 (15 pages).

"Design of a power factor corrector of a digital switch power supply", by Huang Yan, Information Technology Volume, Whole Text Database of Excellent Papers for Graduate and Doctoral Diplomas in China (Papers for Graduate Diploma) (monthly), third edition, pp. 15-16, Mar. 15, 2007 (67 pages).

Office Action issued in corresponding German Application No. 102013211037.5, mailed on Apr. 8, 2016 (12 pages).

* cited by examiner

VEHICLE POWER-SUPPLY CONTROL DEVICE

BACKGROUND OF THE INVENTION

1. Technical Field

The present invention relates to a device that controls a power supply for charging a high-voltage battery mounted on a vehicle or driving an auxiliary machine incorporated in the vehicle.

2. Related Art

On an electric automobile or a hybrid car, the high-voltage battery that is a driving source for a running motor is mounted, and a battery charger for charging the high-voltage battery is provided. A low-voltage power generator is also provided in order to step down a voltage at the high-voltage battery to supply power to various in-vehicle devices (an auxiliary machine). For example, Japanese Unexamined Patent Publication Nos. 2009-27774, 2011-72069, and 2011-223833 each discloses vehicle power-supply control devices each of which includes the battery charger and the low-voltage power generator.

The device disclosed in Japanese Unexamined Patent Publication No. 2009-27774 includes a main electric storage device that can be charged from the outside of the vehicle, a voltage conversion device that steps down the voltage at the main electric storage device and outputs the step-down voltage, a sub-electric storage device that is charged by the voltage output from the voltage conversion device and supplies the power to an auxiliary machine load, and a control device that controls the voltage conversion device. The control device continuously drives the voltage conversion device during running of the vehicle, and the control device intermittently drives the voltage conversion device while the main electric storage device is charged.

The device disclosed in Japanese Unexamined Patent Publication No. 2011-72069 includes an auxiliary machine battery, an electric storage device that can be charged, and a charging device that charges the electric storage device using an AC power supplied from an external power supply. The charging device includes a control power supply that generates a controlling power-supply voltage used to control the charging device using the AC power supplied from the external power supply, an AC/DC converter, and a control device that controls the AC/DC converter. During the charge using the AC power from the external power supply, according to a charge state of the auxiliary machine battery, the control device charges the auxiliary machine battery using the controlling power-supply voltage generated by the control power supply.

The device disclosed in Japanese Unexamined Patent Publication No. 2011-223833 includes an electric storage device that can be charged using the power from the external power supply, an auxiliary machine battery that supplies the power supply voltage to the auxiliary machine load, a DC/DC converter that steps down the power from the electric storage device to supply the power supply voltage to the auxiliary machine load and the auxiliary machine battery, and an AC/DC converter that, using the power from the external power supply, can supply the power supply voltage to a charging ECU (Electronic Control Unit) and charge the auxiliary machine battery. During the charge using the power from the external power supply, one of the DC/DC converter and the AC/DC converter is selectively driven based on the charge state of the auxiliary machine battery and the state of the auxiliary machine load.

In the device including the battery charger for charging the high-voltage battery and the low-voltage power generator for driving the auxiliary machine, the number of components increases, when the controller that controls the battery charger and the controller that controls the low-voltage power generator are separately provided. Therefore, it is conceivable that the controller is shared by the battery charger and the low-voltage power generator. However, in this case, unfortunately the load on the controller increases.

SUMMARY

One or more embodiments of the present invention provides a vehicle power-supply control device, in which one controller controls the battery charger and the low-voltage power generator and the increase in load on the controller can be suppressed even if the controller is shared by the battery charger and the low-voltage power generator.

In accordance with one or more embodiments of the present invention, a vehicle power-supply control device including: a battery charger that converts an externally-supplied AC voltage into a DC voltage used to charge a vehicle high-voltage battery; a low-voltage power generator that converts the DC voltage output from the battery charger into a DC voltage used to drive a vehicle auxiliary machine; and a controller that controls the battery charger and the low-voltage power generator. The battery charger includes a power factor correction circuit that corrects a power factor of the AC voltage and a first DC/DC converter that generates a predetermined DC voltage based on an output of the power factor correction circuit. The low-voltage power generator includes a second DC/DC converter that steps down the DC voltage output from the battery charger and a synchronous rectifier that rectifies an output of the second DC/DC converter in synchronization with a switching operation of the second DC/DC converter. The synchronous rectifier includes a pair of switching elements that performs a switching operation in synchronization with the switching operation of the second DC/DC converter and a pair of diodes that is connected in parallel with the pair of switching elements respectively. When the high-voltage battery is currently charged, the controller stops control of the synchronous rectifier while controlling the first DC/DC converter and the second DC/DC converter. When the control of the synchronous rectifier is stopped, diode rectification is performed by the pair of diodes to output the rectified DC voltage from the second DC/DC converter through each of the diodes. When the high-voltage battery is not currently charged, the controller stops the control of the first DC/DC converter while controlling the second DC/DC converter and the synchronous rectifier.

Therefore, the one controller controls the battery charger and the low-voltage power generator to decrease the number of components. Further, when the high-voltage battery is currently charged, the controller stops the control of the synchronous rectifier while controlling the first and second DC/DC converters, and the controller switches the synchronous rectification to the diode rectification that eliminates necessity for the control. Therefore, the load on the controller is reduced even if the controller is shared by the battery charger and the low-voltage power generator.

In the vehicle power-supply control device according to one or more embodiments of the present invention, the controller may determine whether an output current of the low-voltage power generator is less than or equal to a predetermined threshold when the high-voltage battery is currently charged, the controller may stop the control of the synchronous rectifier when the output current is less than or equal to the threshold, and the controller may control the synchronous rectifier when the output current is greater than the threshold, the controller controls the synchronous rectifier.

In the vehicle power-supply control device according to one or more embodiments of the present invention, the controller may determine whether a vehicle is currently started up when the high-voltage battery is not currently charged, the controller may stop the control of the first DC/DC converter while controlling the second DC/DC converter and the synchronous rectifier when the vehicle is currently started up, and the controller may stop the control of the first DC/DC converter, the second DC/DC converter, and the synchronous rectifier when the vehicle is not currently started up.

Accordingly, one or more embodiments of the present invention provides the vehicle power-supply control device, in which the one controller controls the battery charger and the low-voltage power generator and the increase in load on the controller can be suppressed even if the controller is shared by the battery charger and the low-voltage power generator.

DETAILED DESCRIPTION

Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Hereinafter, there is shown an example of a case in which the present invention is applied to an electric automobile.

Figure 1:
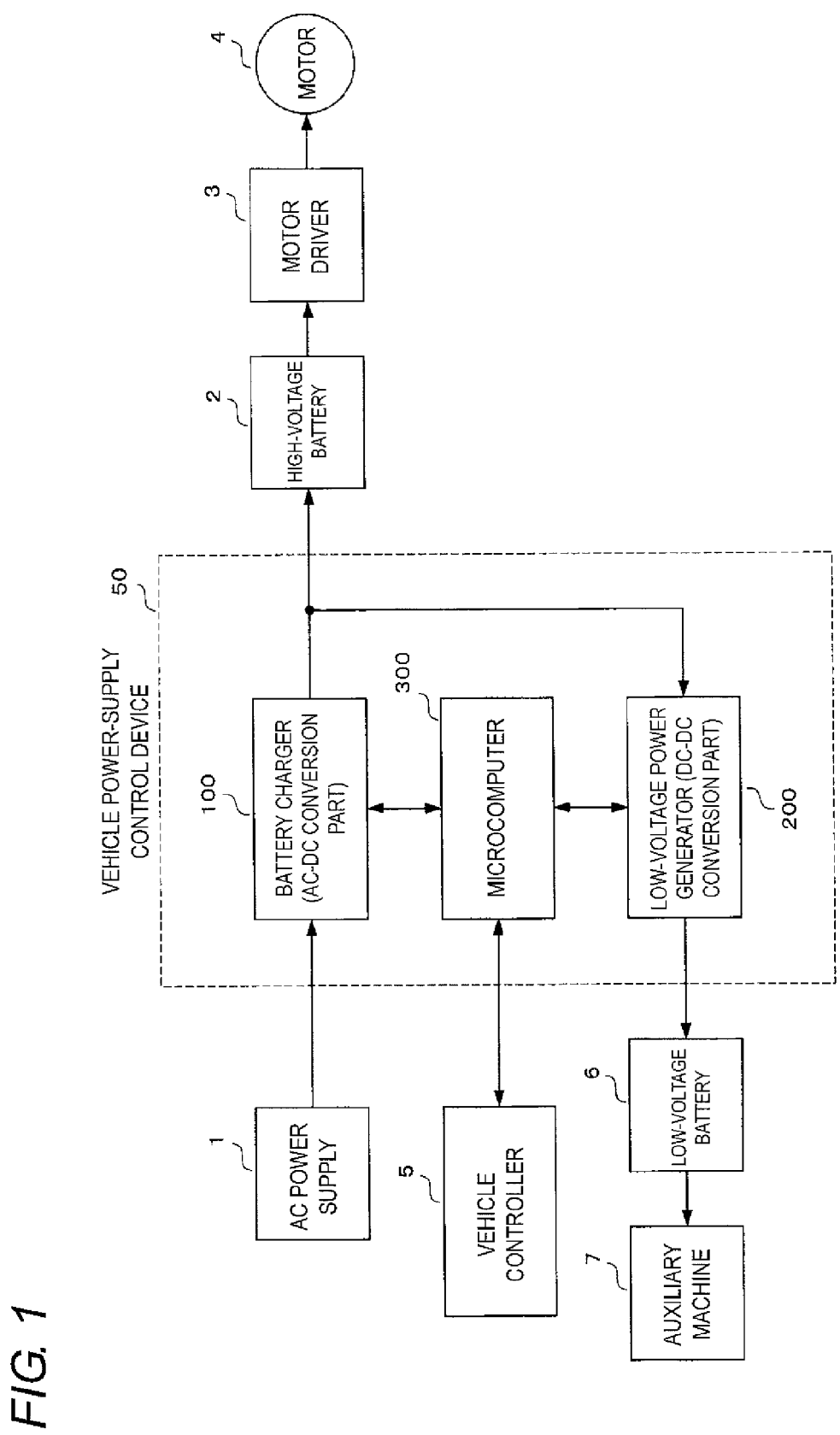
FIG. 1 is a system configuration diagram of an electric automobile equipped with a vehicle power-supply control device according to one or more embodiments of the present invention.

Firstly, a system configuration of the electric automobile equipped with a vehicle power-supply control device (hereinafter simply referred to as a "power-supply control device") will be described with reference to FIG. 1. Referring to FIG. 1, a power-supply control device 50 includes a battery charger 100, a low-voltage power generator 200, and a microcomputer 300. The blocks 100 to 300 are mounted on a board to constitute one unit.

The battery charger 100 converts an AC voltage (for example, AC 80 to 265 V) supplied from an external AC power supply 1 into a DC voltage (for example, DC 220 to 400 V) used to charge a vehicle high-voltage battery 2. Accordingly, the battery charger 100 constitutes an AC/DC conversion part. The high-voltage battery 2 is constructed by a secondary battery such as a lithium-ion battery. A voltage at the high-voltage battery 2 is supplied to a vehicle running motor 4 through a motor driver 3.

The low-voltage power generator 200 converts the DC voltage output from the battery charger 100 in the DC voltage (for example, DC 14 V) used to drive a vehicle auxiliary machine. Accordingly, the low-voltage power generator 200 constructs a DC/DC conversion part. A low-voltage battery 6 for an auxiliary machine is constructed by a secondary battery such as a lead storage battery, and charged by the DC voltage output from the low-voltage power generator 200. The auxiliary machine 7 is driven with the low-voltage battery 6 as a power supply. An auxiliary machine 7 includes various devices, such as an interior light, a power window device, a windshield wiper driving device, an audio device, and a navigation system.

The microcomputer 300 is constructed by a DSP (Digital Signal Processor) to constitute a controller that controls the battery charger 100 and the low-voltage power generator 200. The microcomputer 300 is connected to a vehicle controller 5 through a CAN (Control Area Network) communication bus, and performs a predetermined control operation based on a signal from the vehicle controller 5 (the detail will be described later).

Figure 2:
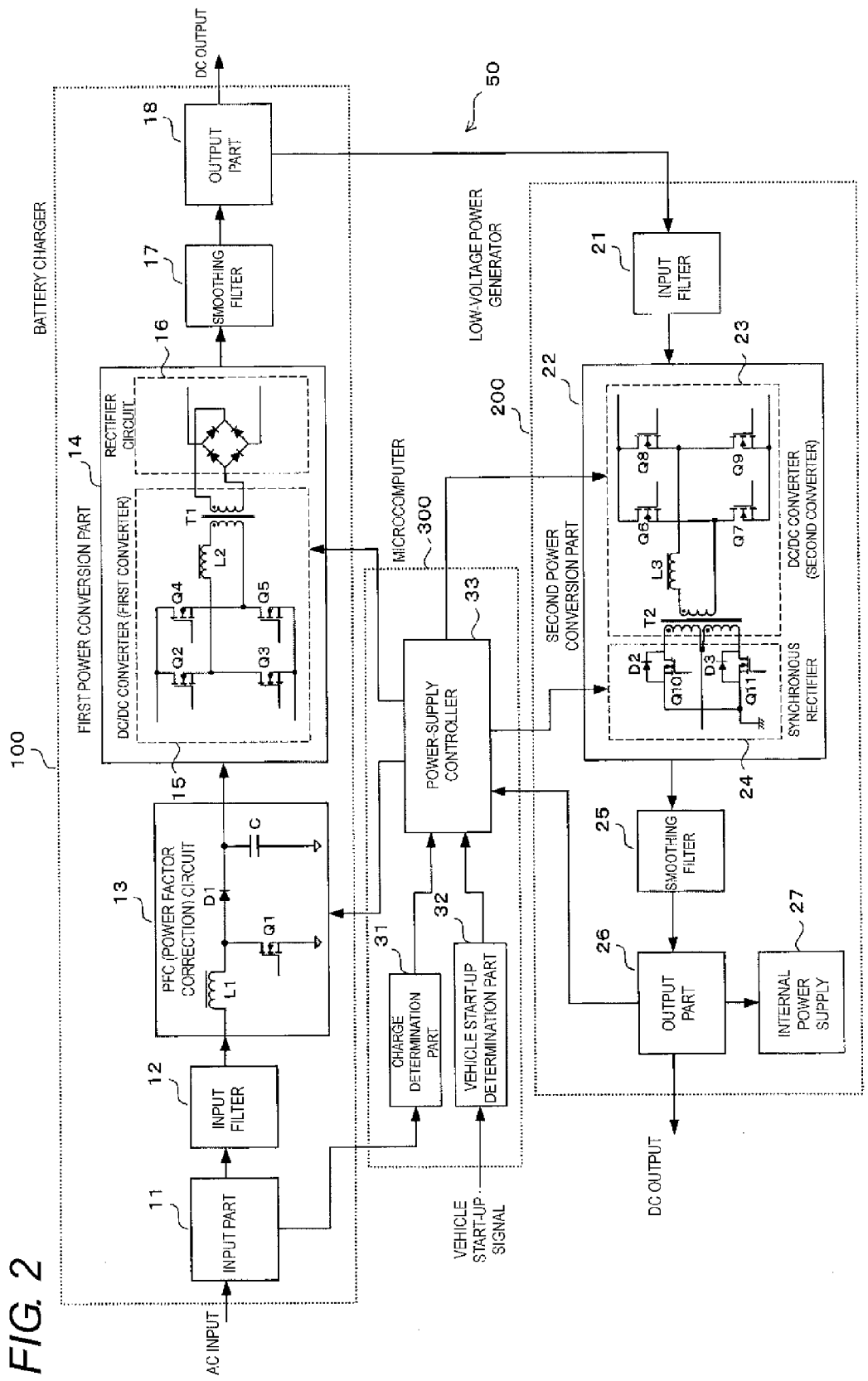
FIG. 2 is a block diagram illustrating a specific configuration of the vehicle power-supply control device.

Next, a specific configuration of the power-supply control device 50 will be described below with reference to FIG. 2.

The details of the battery charger 100 will be described. The battery charger 100 includes an input part 11, an input filter 12, a PFC (Power Factor Correction) circuit 13, a first power conversion part 14, a smoothing filter 17, and an output part 18.

The input part 11 is constructed by a connector or the like, connected to the AC power supply 1 shown in FIG. 1. The input filter 12 is a filter for removing a noise component from the AC voltage input to the input part 11. The PFC circuit 13 is a well-known circuit including a reactor L1, a diode D1, a capacitor C, and a switching element Q1. The switching element Q1 is constructed by a MOS-FET. The PFC circuit 13 boosts and rectifies the input voltage, for example, to DC 390 V by an on/off operation of the switching element Q1, and brings a waveform of an input current close to a sine wave to perform a power factor correction. The on/off operation of the switching element Q1 is controlled by a power-supply controller 33 which will be described later.

The first power conversion part 14 includes a first DC/DC converter (hereinafter referred to as a "first converter") 15 and a rectifier circuit 16. The first converter 15 is a well-known circuit including a transformer T1, a reactor L2, and four switching elements Q2 to Q5. The switching elements Q2 to Q5 are constructed by MOS-FETs, for example. The first converter 15 performs DC/DC conversion of the DC voltage output from the PFC circuit 13 by the on/off operations of the switching elements Q2 to Q5, and generates a predetermined DC voltage. The rectifier circuit 16 is a well-known full-wave rectifier circuit in which bridge connection of four diodes is formed. The smoothing filter 17 is a filter for smoothing the voltage rectified by the rectifier circuit 16. The output part 18 is constructed by a connector or the like, connected to the high-voltage battery 2 shown in FIG. 1.

Next, the details of the low-voltage power generator 200 will be described below. The low-voltage power generator 200 includes an input filter 21, a second power conversion part 22, a smoothing filter 25, an output part 26, and an internal power supply 27.

The DC voltage, which is output from the battery charger 100, is input to the input filter 21. The input filter 21 removes the noise component included in the DC voltage. The second power conversion part 22 includes a second DC/DC converter (hereinafter referred to as a "second converter") 23 and a synchronous rectifier 24. The second converter 23 is a well-known circuit including a transformer T2, a reactor L3, and four switching elements Q6 to Q9. The switching elements Q6 to Q9 are constructed by MOS-FETs, for example. The second converter 23 performs DC/DC conversion of the DC voltage output from the input filter 21 by the on/off operations of the switching elements Q6 to Q9, and steps down the DC voltage.

The synchronous rectifier 24 is a well-known circuit including a pair of switching elements Q10 and Q11 and a pair of diodes D2 and D3. The switching elements Q10 and Q11 perform the switching operations in synchronization with the switching operation of the second converter 23. The diodes D2 and D3 are connected in parallel with the switching elements Q10 and Q11, respectively. The switching elements Q10 and Q11 are constructed by MOS-FETs, for example. Actually each of the diodes D2 and D3 is a parasitic diode between a source and drain of the FET. By adopting not a diode rectification method but a synchronous rectification method, a power loss of a rectifying part can be minimized to enhance conversion efficiency.

The smoothing filter 25 is a filter for smoothing the voltage rectified by the synchronous rectifier 24. The output part 26 is constructed by a connector or the like, connected to the low-voltage battery 6 shown in FIG. 1. The internal power supply 27 generates an internal power necessary to drive each part of the power-supply control device 50 based on the DC voltage output from the smoothing filter 25.

Finally, the details of the microcomputer 300 will be described below. The microcomputer 300 includes a charge determination part 31, a vehicle start-up determination part 32, and the power-supply controller 33. Although the blocks 31 to 33 are expressed by hardware in FIG. 2, actually functions of the blocks 31 to 33 are implemented by software.

The charge determination part 31 determines whether the AC power supply 1 (see FIG. 1) is connected to the input part 11 of the battery charger 100, namely, whether the high-voltage battery 2 is currently charged. The vehicle start-up determination part 32 determines whether a vehicle is currently started up based on a vehicle start-up signal transmitted from the vehicle controller 5 (see FIG. 1). The power-supply controller 33 performs predetermined control to the battery charger 100 and the low-voltage power generator 200 based on determination results of the charge determination part 31 and vehicle start-up determination part 32.

Specifically, the power-supply controller 33 drives the switching element Q1 of the PFC circuit 13 and the switching elements Q2 to Q5 of the first converter 15 in the battery charger 100 using a PWM (Pulse Width Modulation) signal, and controls the on/off operations of the switching elements. Further, the power-supply controller 33 drives the switching elements Q6 to Q9 of the second converter 23 and the switching elements Q10 and Q11 of the synchronous rectifier 24 in the low-voltage power generator 200 using the PWM signal, and controls the on/off operations of the switching elements.

In the power-supply control device 50 having the above configuration, the battery charger 100 charges the high-voltage battery 2 while the vehicle is stopped. During the charge of the battery, the power-supply controller 33 drives the switching element Q1 of the PFC circuit 13 and the switching elements Q2 to Q5 of the first converter 15 using the PWM signal, and puts the PFC circuit 13 and the first converter 15 into an operating state.

During the charge of the battery, the power-supply controller 33 drives the switching elements Q6 to Q9 of the second converter 23 using the PWM signal, and puts the second converter 23 into the operating state. At this point, the switching elements Q10 and Q11 of the synchronous rectifier 24 are not driven, but the synchronous rectifier 24 becomes a non-operating state. This is attributed to the following reason. When the vehicle is in the stop state, the auxiliary machine 7 is not operated, but a small load is applied on the low-voltage battery 6. Therefore a charging current of the battery is also small. In such a state, even if the synchronous rectifier 24 performs the synchronous rectification, such a large effect cannot be expected from the viewpoint of reducing the power loss. On the other hand, it is necessary to control the switching elements Q10 and Q1 in order to perform the synchronous rectification, which increases the load on the power-supply controller 33.

For this reason, the synchronous rectifier 24 does not perform the synchronous rectification using the switching elements Q10 and Q11 during the charge of the battery. However, even if the switching elements Q10 and Q11 are turned off, the diodes D2 and D3 perform the rectification because the diodes D2 and D3 become alternately conduction states according to the operation of the second converter 23. Therefore, the rectified DC voltage is output from the second converter 23 through the diodes D2 and D3. Accordingly, while the vehicle is stopped, the voltage necessary for the internal power supply 27 can be generated and the low-voltage battery 6 can be charged. Further, the diode rectification that eliminates necessity for the control of the switching element is performed instead of the synchronous rectification, which allows suppression of the increase in load on the power-supply controller 33.

On the other hand, because the high-voltage battery 2 is not charged during the running of the vehicle, the power-supply controller 33 does not drive the switching element Q1 of the PFC circuit 13 and the switching elements Q2 to Q5 of the first converter 15. Accordingly, the PFC circuit 13 and the first converter 15 become the non-operating state. Further, during the running of the vehicle, because the auxiliary machine 7 is operated to increase the load on the low-voltage battery 6, the power-supply controller 33 drives the switching elements Q6 to Q9 of the second converter 23 and the switching elements Q10 and Q11 of the synchronous rectifier 24 using the PWM signal, and puts the second converter 23 and the synchronous rectifier 24 into the operating state.

Figure 3:
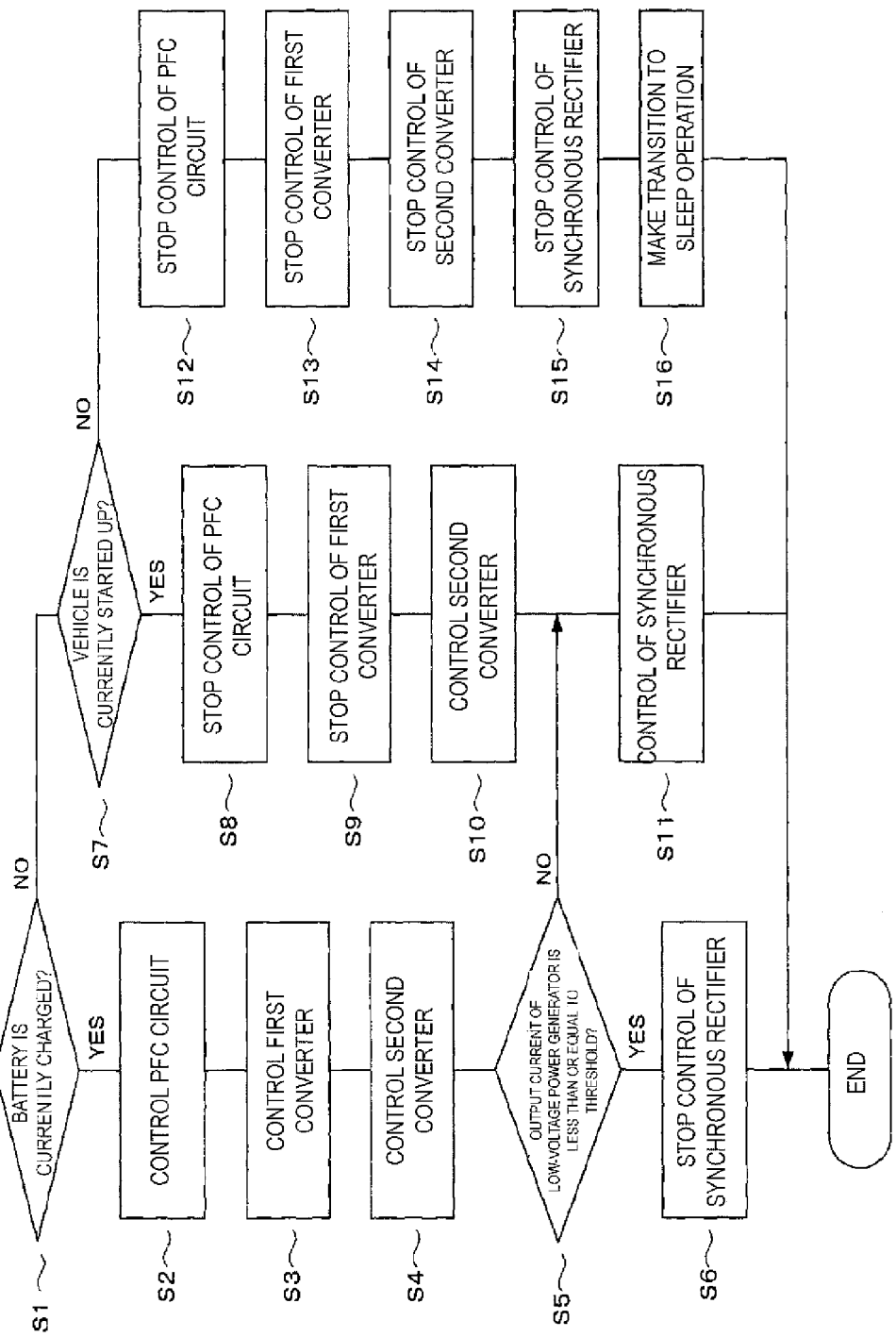
FIG. 3 is a flowchart illustrating a detailed procedure of power supply control.

FIG. 3 is a flowchart illustrating the detailed control operation performed by the power-supply controller 33. A sequence of procedures illustrated in the flowchart is repeatedly performed at a constant period.

In Step S1, the power-supply controller 33 determines whether the high-voltage battery 2 is currently charged. This determination is made based on the determination result of the charge determination part 31. When the high-voltage battery 2 is currently charged (YES in Step S1), the flow goes to Step S2, and the power-supply controller 33 controls the PFC circuit 13. In other words, as described above, the power-supply controller 33 drives the switching element Q1 using the PWM signal to put the PFC circuit 13 into the operating state. Subsequently, in Step S3, the power-supply controller 33 controls the first converter 15. In other words, as described above, the power-supply controller 33 drives the switching elements Q2 to Q5 using the PWM signal to put the first converter 15 into the operating state. Further, in Step S4, the power-supply controller 33 controls the second converter 23. In other words, as described above, the power-supply controller 33 drives the switching elements Q6 to Q9 using the PWM signal to put the second converter 23 into the operating state.

Then, the flow goes to Step S5, and the power-supply controller 33 determines whether the output current of the output part 26 of the low-voltage power generator 200 is less than or equal to a predetermined threshold. When the output current is less than or equal to the predetermined threshold (YES in Step S5), the flow goes to Step S6, and the power-supply controller 33 stops the control of the synchronous rectifier 24. That is, the power-supply controller 33 does not drive the switching elements Q10 and Q11 using the PWM signal, but the power-supply controller 33 puts the synchronous rectifier 24 into the non-operating state. The reason is already described above. As described above, the synchronous rectifier 24 outputs the DC voltage, because the diodes D2 and D3 perform the diode rectification even if the synchronous rectifier 24 is in the non-operating state.

On the other hand, when the output current is greater than the predetermined threshold (NO in Step S5), the flow goes to Step S11, and the power-supply controller 33 controls the synchronous rectifier 24. In other words, because of the large output current, it is necessary that the power loss be suppressed by the synchronous rectification. Therefore, the power-supply controller 33 drives the switching elements Q10 and Q11 using the PWM signal to put the synchronous rectifier 24 into the operating state.

When the high-voltage battery 2 is not currently charged in Step S1 (NO in Step S1), the flow goes to Step S7. In Step S7, the power-supply controller 33 determines whether the vehicle is currently started up. This determination is made based on the determination result of the vehicle start-up determination part 32. When the vehicle is currently started up (YES in Step S7), the flow goes to Step S8, and the power-supply controller 33 stops the control of the PFC circuit 13. That is, the power-supply controller 33 does not drive the switching element Q1 using the PWM signal, but the power-supply controller 33 puts the PFC circuit 13 into the non-operating state. Subsequently, in Step S9, the power-supply controller 33 stops the control of the first converter 15. That is, the power-supply controller 33 does not drive the switching elements Q2 to Q5 using the PWM signal, but the power-supply controller 33 puts the first converter 15 into the non-operating state. Further, in Step S10, the power-supply controller 33 controls the second converter 23. That is, the power-supply controller 33 drives the switching elements Q6 to Q9 using the PWM signal to put the second converter 23 into the operating state. Moreover, in Step S11, the power-supply controller 33 controls the synchronous rectifier 24. That is, the power-supply controller 33 drives the switching elements Q10 and Q11 using the PWM signal to put the synchronous rectifier 24 into the operating state.

When the vehicle is not currently started up in Step S7 (NO in Step S7), namely, when the battery is not charged while the vehicle is stopped, the flow goes to Step S12, the power-supply controller 33 stops the control of the PFC circuit 13. That is, the power-supply controller 33 does not drive the switching element Q1 using the PWM signal, but the power-supply controller 33 puts the PFC circuit 13 into the non-operating state. Subsequently, in Step S13, the power-supply controller 33 stops the control of the first converter 15. That is, the power-supply controller 33 does not drive the switching elements Q2 to Q5 using the PWM signal, but the power-supply controller 33 puts the first converter 15 into the non-operating state. In Step S14, the power-supply controller 33 stops the control of the second converter 23. That is, the power-supply controller 33 does not drive the switching elements Q6 to Q9 using the PWM signal, but the power-supply controller 33 puts the second converter 23 into the non-operating state. Further, in Step S15, the power-supply controller 33 stops the control of the synchronous rectifier 24. That is, the power-supply controller 33 does not drive the switching elements Q10 and Q11 using the PWM signal, but the power-supply controller 33 puts the synchronous rectifier 24 into the non-operating state. Then, in Step S16, the power-supply controller 33 makes a transition to a sleep operation to wait for the start of the battery charge (Step S1) or the vehicle start-up (Step S7).

According to the above embodiment, the one microcomputer 300 controls the battery charger 100 and the low-voltage power generator 200 to decrease the number of components. Moreover, during the charge of the high-voltage battery 2, while the first converter 15 and the second converter 23 are controlled, the control of the synchronous rectifier 24 is stopped to perform the diode rectification instead of the synchronous rectification, so that the load on the microcomputer 300 can be reduced even if the microcomputer 300 is shared by the battery charger 100 and the low-voltage power generator 200.

In one or more embodiments of the present invention, various embodiments can be made in addition to the above embodiment. For example, in the above embodiment, whether the output current is less than or equal to the threshold is determined in Step S5 in FIG. 3. Alternatively, Step S5 is omitted and the control of the synchronous rectifier 24 may always be stopped during the charge of the battery.

Further, in the above embodiment, by way of example, the switching elements Q1 to Q11 are driven using the PWM signal. Alternatively, the switching elements Q1 to Q11 may be driven using a pulse signal that is not the PWM signal.

Moreover, above, by way of example, one or more embodiments of the present invention is applied to an electric automobile. However, one or more embodiments of the present invention can also be applied to a hybrid car.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle power-supply control device comprising:
    a battery charger that converts an externally-supplied AC voltage into a DC voltage used to charge a vehicle high-voltage battery;
    a low-voltage power generator that converts the DC voltage output from the battery charger into a DC voltage used to drive a vehicle auxiliary machine; and
    a controller that controls the battery charger and the low-voltage power generator,
    wherein the battery charger includes a power factor correction circuit that corrects a power factor of the AC voltage and a first DC/DC converter that generates a predetermined DC voltage based on an output of the power factor correction circuit,
    wherein the low-voltage power generator includes a second DC/DC converter that steps down the DC voltage output from the battery charger and a synchronous rectifier that rectifies an output of the second DC/DC converter in synchronization with a switching operation of the second DC/DC converter,
    wherein the synchronous rectifier includes a pair of switching elements that performs a switching operation in synchronization with the switching operation of the second DC/DC converter and a pair of diodes that is connected in parallel with the pair of switching elements respectively, wherein when the high-voltage battery is currently charged, the controller stops control of the synchronous rectifier while controlling the first DC/DC converter and controlling the second DC/DC converter to generate the DC voltage to drive the vehicle auxiliary machine, wherein when the high-voltage battery is not currently charged, the controller stops the control of the first DC/DC converter while controlling the second DC/DC converter and the synchronous rectifier, and wherein when the control of the synchronous rectifier is stopped, diode rectification is performed by the pair of diodes to output the rectified DC voltage from the second DC/DC converter through each of the diodes.

2. The vehicle power-supply control device according to claim 1, wherein the controller determines whether an output current of the low-voltage power generator is less than or equal to a predetermined threshold when the high-voltage battery is currently charged, wherein the controller stops the control of the synchronous rectifier when the output current is less than or equal to the threshold, and wherein the controller controls the synchronous rectifier when the output current is greater than the threshold.

3. The vehicle power-supply control device according to claim 1, wherein the controller determines whether a vehicle is currently started up when the high-voltage battery is not currently charged, wherein the controller stops the control of the first DC/DC converter while controlling the second DC/DC converter and the synchronous rectifier when the vehicle is currently started up, and wherein the controller stops the control of the first DC/DC converter, the second DC/DC converter, and the synchronous rectifier when the vehicle is not currently started up.

* * * * *